Oct. 19, 1954 — J. R. BROWN — 2,691,899
VALVE STEM ADJUSTER
Filed April 21, 1950

INVENTOR.
JOHN ROWLAND BROWN
BY Woodling and Krost
his attys.

Patented Oct. 19, 1954

2,691,899

UNITED STATES PATENT OFFICE 2,691,899

VALVE STEM ADJUSTER

John Rowland Brown, Cleveland, Ohio, assignor to The Reliance Gauge Column Company Application April 21, 1950, Serial No. 157,294

4 Claims. (Cl. 74—471)

This invention relates in general to the mounting of a lever arm on a valve stem and especially to an adjustable mounting.

One of the objects of the invention is to provide a valve stem with a lever arm, wherein the lever arm may be fastened to the stem in any one of my adjustment positions.

Another object of the invention is to provide a valve with a valve stem and lever arm wherein a gear is associated with the stem and the lever arm to provide for proper adjustment and positioning of the lever arm.

Other objects and a fuller understanding of this invention may be had by referring to the following description and claims, taken in conjunction with the accompanying drawing, in which:

Figure 3:
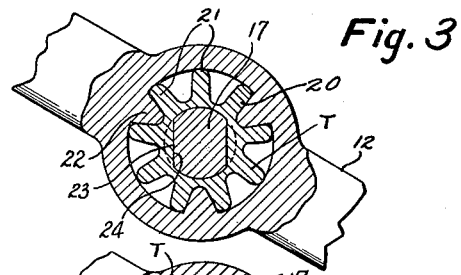
Figure 3 is a sectional view along the line 3—3 of Figure 2.
Figure 5:
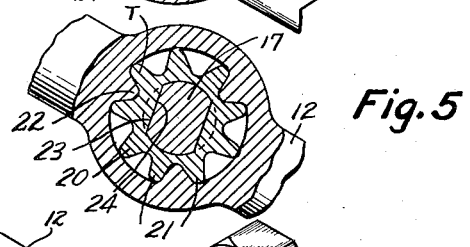
Figure 4:
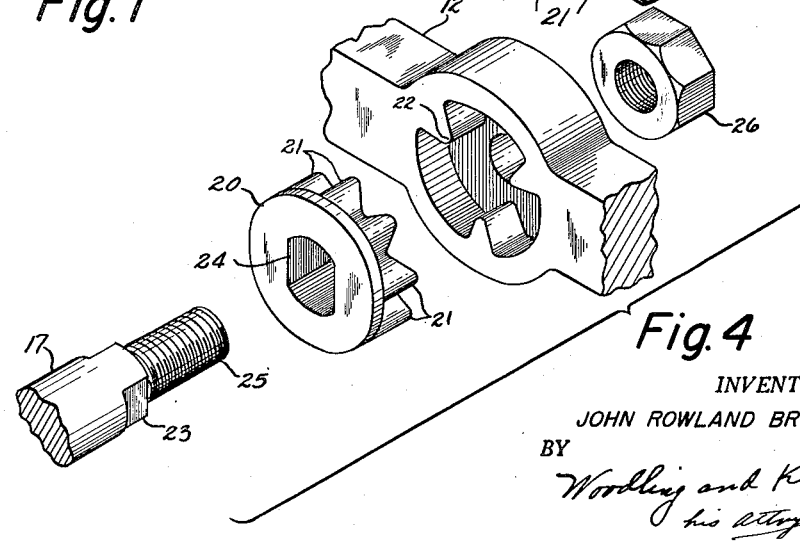

Figure 4 is an exploded view illustrating the features of the structure used in fastening the lever arm to the valve stem, and Figure 5 is a view similar to Figure 3, but shows the adjustable gear member turned 180 degrees on the valve stem, thereby adjustably shifting the valve stem through an angle of 20 degrees from the position shown in Figure 3 with the handle remaining in the same position as shown in Figure 3.

Figure 1:
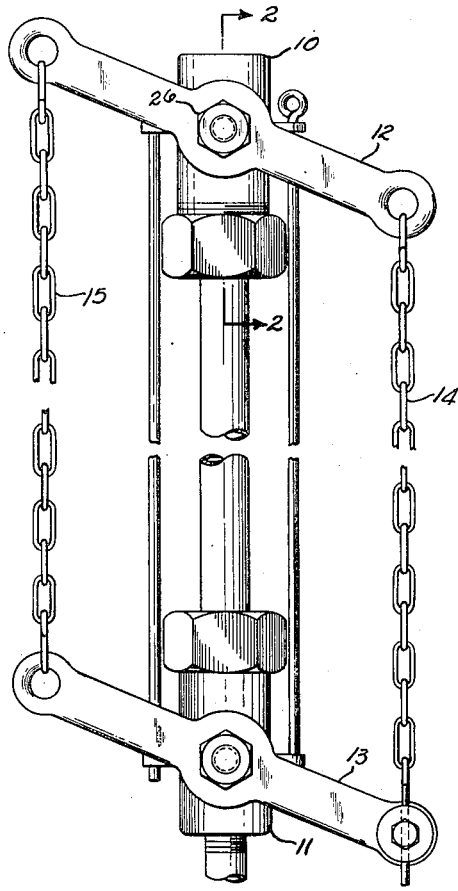
Figure 1 is an elevational view of a water gauge having a valve at each end thereof.

The water gauge illustrated in Figure 1 has a valve 10 at one end thereof and a valve 11 at the other end thereof. The valve 10 has a lever arm 12 and the valve 11 has a lever arm 13. These lever arms 12 and 13 are interconnected by at least one of the interconnectors 14 and 15, such, for example, as the chains referred to by the numbers 14 and 15.

The valves 10 and 11 operate simultaneously so that both valves are closed at the same time and so that both valves are opened at the same time. The interconnectors or chains 14 and 15 on the lever arms 12 and 13 insure this operation. Thus, when the lever arm 12 on the valve 10 is moved to open or close the valve 10, the valve 11 is opened or closed simultaneously therewith.

Figure 2:
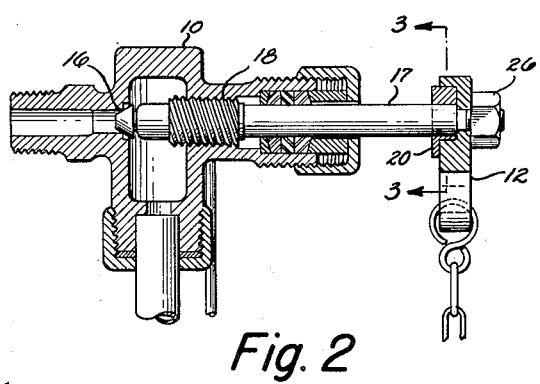
Figure 2 is a view along the line 2—2 of Figure 1 illustrating one of the valves in cross-section.

In Figure 2, the valve 10 is illustrated in cross-section. The valve has the ordinary valve seat 16 and the valve stem 17 which is threaded into the body of the valve as at 18. The valves 10 and 11 are substantially identical and are designed so that a slight angular movement of the valve stem 17 opens or closes the valve. It is noted that a fast tapered thread 18 is used on the stem 17 to provide the desired longitudinal movement of the valve stem 17 with slight rotational movement thereof.

Since the valve stem 17 is angularly moved or turned a few degrees to open or close the valve, the lever arm 12 which is fastened to the valve stem 17 must have many adjustment positions of fastening so that the lever arm 12 may be positioned in proper alignment with the lever arm 13 of the valve 11. In the present instance, a plurality of positions for fastening the lever arm 12 to the valve stem 17 is provided in a very inexpensive manner. For purposes of description, the exact details of the structure illustrated in the drawings will be used. However, it is understood that other combinations may be similarly employed without departing from the spirit and the scope of the invention. In the present mounting, an adjustable member 20 is positioned on the stem 17 and engages the lever arm 12. This adjustable member 20 may be in the form of a gear and is provided with a plurality of teeth 21. In referring to these teeth 21, it is understood that they are portions of the adjustable member 20 and may be referred to as positioning portions or mating surfaces. In this instance, the adjustable member 20 is provided with nine positioning portions or teeth 21. The lever arm 12 has at least one portion therof, such as the portion 22 engaging a desired positioning portion or tooth 21 of the adjustable member 20.

The valve stem 17 is provided with a pair of diametrically opposed flats 23 and the adjustable member 20 is provided with diametrically opposite portions 24 engageable with these flats 23 as illustrated in Figure 3 of the drawings. In assembling or fastening the lever arm 12 on to the valve stem 17, the adjustable member 20 is first slid on to the lever arm 17 with the portions 24 thereof cooperatively aligned with the flats 23 of the valve stem 17. Next, the lever arm 12 is slid on to the valve stem with the tooth portion 22 thereof cooperating with the desired positioning portion 21 of the adjustable member 20. The valve stem 17 is provided with suitable threads 25 for receiving a nut 26 which holds the lever arm and the adjustment in operative connection with the stem. It is understood that other suitable removable members may be used in place of the nut 26 to hold the lever arm and the adjustment member in operative connection with the valve stem.

As is illustrated in Figures 3 and 5, the valve stem has two flats spaced diametrically of each other and the adjustment member has an odd number of teeth thereon (in this instance, 9). By observing Figure 3, it will be noted that with the adjustment member in one position on the valve stem, the lever arm may be positioned in nine independent and equally spaced angular positions relative to the valve stem. However, if the adjustment member 20 is turned 180 degrees relative to the valve stem, the angular positions of the lever arm will be in between the former nine positions of the lever arm. Therefore, by providing the valve stem with two flats 23, and the adjustment member 20 with nine teeth 21, the lever arm 12 may be positioned in any one of 18 positions relative to the valve stem. The same adjustable relationship may be stated in another way; namely, with the lever arm 12 remaining in the same position and with the adjustable gear member 20 turned 180 degrees on the valve stem 17, the result is such that the valve stem 17 is shifted through an angle of 20 degrees with respect to the lever arm 12. This is the condition shown in Figure 5 as compared to Figure 3. Thus, suppose that the top valve 10 slightly leaks because the valve stem 17 is not turned quite tight enough while at the same time the valve stem in the bottom valve 11 is turned tight, and it becomes necessary to angularly shift or tighten the valve stem 17 with the lever arms 12 and 13 remaining in the same position. The lever arms 12 and 13, since they are linked together by the chains 14 and 15, can not be turned with respect to each other, and thus in order to correct the assumed condition of the leaking valve 10, it is necessary to angularly shift the valve stem 17 to a tightened position while keeping the lever arm 12 in the same position, because the position of the lever arm 12 is already determined by the position of the lever arm 13 which is turned tight. By comparing Figures 3 and 5 it is noted that the stem 17 has been shifted but 20 degrees, being one-half the angular pitch between adjacent gear teeth. The tooth T in Figure 3, when the adjustable gear member 20 is turned 180 degrees on the valve stem 17, would coincide with the tooth portion 22 of the lever arm 12, but this can not physically exist and yet have mating tooth engagement. In order to have mating tooth engagement, the valve stem 17 is then angularly turned tighter in a clockwise direction through an angle of 20 degrees until the tooth T clears the tooth portion 22, making a mating tooth engagement as shown in the view of Figure 5.

The above combination of using two flats on the valve stem and nine teeth on the adjustment member has been decided upon since it gives 18 adjustments or a chance to position the lever arm in positions of 20 degrees spacing about the valve stem, yet retaining the strength of the nine large teeth, rather than having eighteen small weak teeth. Other combinations may be worked out to obtain other angular amounts of spacings of the positioning of the lever arm on the valve stem. However, the present disclosure and example has been found to be very practical, sturdy and yet inexpensive to manufacture.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a valve assembly having first and second valves each having turnable stems spaced apart from each other, first and second actuating lever members for said stems, respectively, and connecting means between said first and second actuating lever members whereby they rotate together, the provision of first and second adjustable members, respectively, on said first and second stems, said first turnable stem and said first adjustable member having a fixed plural number of complementary mating surfaces to provide said fixed number of angularly related positions therebetween, said second turnable stem and said second adjustable member having said fixed plural number of complementary mating surfaces to provide said fixed number of angularly related positions therebetween, said first actuating lever member and said first adjustable member constituting a first set of interengaging members, one of said members of said first set having a given plural number of complementary mating surfaces to provide said given number of angularly related positions between said lever member and said first adjustable member, said second actuating lever member and said second adjustable member constituting a second set of interengaging members, one of said members of said second set having said given number of complementary mating surfaces to provide said given number of angularly related positions between said second lever member and said second adjustable member, said fixed number of complementary mating surfaces and said given number of said complementary mating surfaces being related to each other as to provide a ratio wherein the ratio as a fraction when reduced to its lowest terms has a number which is odd, and whereby with each valve stem and corresponding actuating lever member relative adjustment positions therebetween are obtainable, without disconnecting said connecting means from said lever members, equal to the product of said fixed number and given number divided by the largest common factor thereof and yet retaining the greater strength of said fixed and given number of complementary mating surfaces.

2. In a valve assembly having first and second valves having turnable stems spaced apart from each other, first and second actuating lever members for said stems, respectively, and connecting means between said first and second actuating lever members whereby they rotate together, the provision of first and second adjustable members, respectively, on said first and second stems, said first turnable stem and said first adjustable member having an even number of complementary mating surfaces to provide said even number of fixed angularly related positions therebetween, said second turnable stem and said second adjustable member having said even number of complementary mating surfaces to provide said even number of fixed angularly related positions therebetween, said first actuating lever member and said first adjustable member constituting a first set of interengaging members, one of said members of said first set having an odd plural number of complementary mating surfaces to provide said odd number of angularly related positions therebetween, said second actuating lever member and said second adjustable member constituting a second set of interengaging members, one of said members of said second set having said odd number of complementary mating surfaces to provide said odd number of angularly related positions therebetween, whereby with each valve stem and corresponding actuating lever member relative adjustment positions therebetween are obtainable without disconnecting said connecting means from said lever members equal to the product of said odd number and even number divided by the largest common factor thereof and yet retaining the greater strength of said odd and even number of complementary mating surfaces.

3. In a valve assembly having first and second valves having turnable stems spaced apart from each other, first and second levers for said stems, and connecting means between said levers whereby they rotate together, the provision of first and second adjustable members respectively on said first and second stems, said first and second turnable stems each having an even number of flats, said adjustable members respectively having means engageable with said flats on said stems to provide said even number of angularly related positions between each member and the respective stem, each said adjustable member having an odd plural number of positioning portions thereon, said first lever having a portion thereof engaging a desired positioning portion of said first adjustable member and cooperating therewith to effect a mechanical connection between said first lever and said first stem in angularly related positions therebetween equal to said odd number, said second lever having a portion thereof engaging a desired positioning portion of said second adjustable member and cooperating therewith to effect a mechanical connection between said second lever and said second stem in angularly related positions therebetween equal to said odd number, whereby with each valve stem and corresponding lever relative adjustment positions therebetween are obtainable without disconnecting said connecting means from said levers equal to the product of said odd number and even number divided by the largest common factor thereof and yet retaining the greater strength of said even number of flats and said odd number of positioning portions.

4. In a valve assembly having first and second valves having turnable stems spaced apart and generally parallel with each other, first and second actuating lever members for said turnable stems, and connecting chains between said first and second actuating lever members whereby they rotate together, the provision of first and second star wheel members, respectively, on said first and second stems, said first turnable stem and said first star wheel member having two complementary mating surfaces to provide two angularly related positions therebetween, said second turnable stem and said second star wheel member having two complementary mating surfaces to provide two angularly related positions therebetween, said first actuating lever member and said first star wheel member constituting a first set of interengaging members, one of said members of said first set having nine complementary mating teeth to provide nine angularly related positions between said lever member and said first star wheel member, said second actuating lever member and said second star wheel member constituting a second set of interengaging members, one of said members of said second set having nine complementary mating teeth to provide nine angularly related positions between said second lever member and said second star wheel member, said two complementary mating surfaces and said nine mating teeth being related to each other as to provide a ratio wherein the ratio as a fraction when reduced to its lowest terms has a number which is odd, and whereby with each valve stem and corresponding actuating lever member relative adjustment positions therebetween are obtainable without disconnecting said connecting chains from said lever members equal to the product of two and nine and yet retaining the greater strength of said two mating surfaces and said nine mating teeth.

References Cited in the file of this patent
UNITED STATES PATENTS

| Number | Name | Date |
|---|---|---|
| 242,176 | Bailey | May 31, 1881 |
| 329,586 | Montress | Nov. 3, 1885 |
| 973,337 | Bordo | Oct. 18, 1910 |
| 1,088,247 | Thompson | Feb. 24, 1914 |
| 1,217,132 | Amos | Feb. 27, 1917 |
| 2,200,999 | Sholes | May 14, 1940 |
| 2,463,066 | Stuvel | Mar. 1, 1949 |
| 2,607,616 | Davison | Aug. 19, 1952 |